April 18, 1961 R. J. EHRET 2,980,768
MAGNETIC RECORDING SYSTEM
Filed Aug. 1, 1957
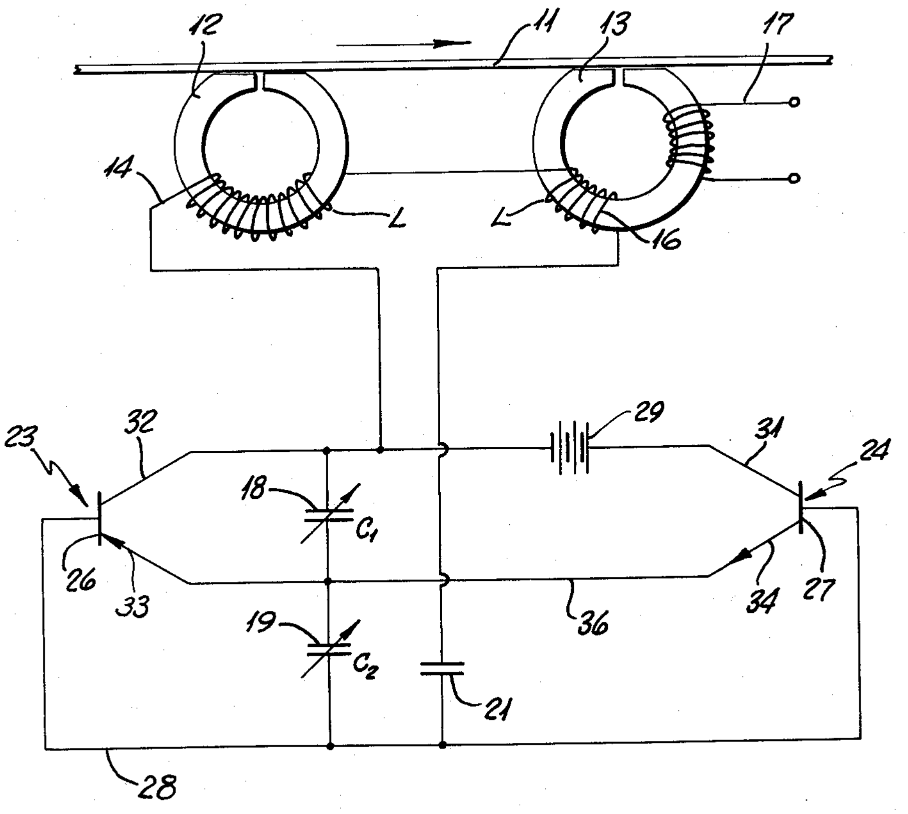
ROBERT J. EHRET
INVENTOR.
BY Flehr & Swain
ATTORNEYS United States Patent Office 2,980,768

Patented Apr. 18, 1961

2,980,768

MAGNETIC RECORDING SYSTEM

Robert J. Ehret, Los Altos, Calif., assignor to Ampex Corporation, Redwood City, Calif., a corporation of California Filed Aug. 1, 1957, Ser. No. 675,749

13 Claims. (Cl. 179—100.2)

This invention relates generally to a magnetic recording system, and more particularly to a complementary symmetry transistor oscillator suitable for applying A.-C. bias current and/or A.-C. power to the magnetic head windings.

In magnetic recording, a record is made by variably magnetizing a moving magnetic medium such as wire, tape or the like. All systems of magnetic recording operate by moving the magnetizable medium past a recording head or heads. The recording heads comprise a coil which carries an electric current of a frequency corresponding to the sound to be recorded and a ferromagnetic core having spaced pole pieces. The recording medium has an elementary portion thereof subject to the magnetic field in the core. It has been found that the quality of recording is greatly improved and that the noise in the recording is considerably reduced by employing A.-C. biasing, that is, superposing an alternating magnetic field on the recording field.

Generally, it is desirable to erase any former magnetic history on the recording medium. This may be accomplished by either A.-C. or D.-C. methods. In A.-C. erasing, the medium is passed along a decaying alternating magnetic field in which the initial values of the field are great enough to saturate the medium completely and in which subsequent reversals of the field gradually decrease to zero. Generally, an erasing head includes a coil which carries the A.-C. current, and a core which has spaced poled pieces.

For reasons of simplicity and economy, it is often desirable to use the same oscillator to provide both A.-C. bias current and A.-C. power used for erasing.

It is a general object of this invention to provide a novel transistor oscillator suitable for use to supply A.-C. bias current and/or A.-C. erasing power.

It is another object of the present invention to provide a complementary symmetry transistor oscillator in which the bias and/or erase windings of the associated heads form a part of the resonant circuit.

It is still a further object of the present invention to provide a complementary symmetry transistor oscillator in which a pair of complementary transistors are connected to a parallel resonant circuit which includes the windings of the associated magnetic heads.

These and other objects of the invention will become more apparent from the following description when read in conjunction with the accompanying drawing.

Referring to the drawing, a magnetizable recording medium 11 travels to the right past the erase head 12 and the recording head 13. The head 12 is provided with an erase winding 14. The recording head 13 may be provided with a bias winding 16 and a recording winding 17, as shown. In the embodiment shown, the oscillator, to be presently described, is employed for supplying both the A.-C. bias current and the A.-C. erase power. Thus the erase winding 14 and the bias winding 16 are connected in series.

A pair of variable capacitors 18 and 19 is serially connected. The coils 14 and 16 are connected in parallel with the capacitors 18 and 19 to form a parallel resonant circuit. A blocking capacitor 21 may be employed to eliminate any D.-C. current in the coils 14 and 16. In certain instances, it may be necessary to provide additional series inductance to obtain a desired frequency of oscillation.

A pair of complementary transistors 23 and 24 is connected to the parallel resonant circuit. For example, the transistor 23 may comprise a PNP transistor, while the transistor 24 may comprise an NPN transistor. The bases 26 and 27 are connected together to the lead 28 which is connected to one side of the tank circuit. A battery 29 has its plus terminal connected to the collector 31 of the transistor 24 and its negative terminal connected to the collector 32 of the transistor 23. The negative terminal is also connected to the other side of the parallel resonant circuit. The emitters 33 and 34 are connected to the lead 36 which is connected to the common terminal of the capacitors 18 and 19.

The frequency of operation of the circuit is determined by the inductance and capacitance in the resonant circuit. The frequency of operation is given by:

$$f=\frac{1}{2\pi\sqrt{LC}}$$

where $L$=the inductance
$C$=the capacitance.

For the circuit shown:

$$C=\frac{C_1C_2}{C_1+C_2}$$

A complementary symmetry oscillator was constructed as shown in the drawing. The transistor 23 was a Sylvania 2N101 PNP junction transistor. The transistor 24 was a Sylvania 2N102 NPN junction transistor. The value of each of the capacitors $C_1$ and $C_2$ was variable between .001 and 4 microfarads. The inductance was 2 millihenrys. The blocking capacitor had a value of 100 microfarads. The circuit constructed in accordance with the above supplied suitable erasing power and biasing current. The frequency of operation was 4 kc.–80 kc. as the capacitors were varied between their limits.

Thus it is seen that I have provided a novel complementary symmetry oscillator suitable for use in magnetic recording systems. The oscillator does not employ any resistors and thus its efficiency is relatively high.

I claim:

1. In a magnetic tape system including at least one magnetic head having a winding thereon, a source of alternating current frequencies comprising a parallel resonant circuit, including at least one capacitor and the winding of said head, a pair of complementary transistors each having at least emitter, collector and base electrodes, said base electrodes connected together to one side of the parallel resonant circuit, said collector electrodes being respectively connected to opposed terminals of a voltage supply and coupled to the other terminal of the resonant circuit, and said emitter electrodes being connected to the capacitor to form a symmetrical complementary oscillator.

2. Apparatus as in claim 1 wherein said complementary transistors comprise a PNP and an NPN transistor.

3. Apparatus as in claim 1 in which a blocking condenser is connected in series with said winding.

4. Apparatus as in claim 1 in which said resonant circuit includes erase and bias windings.

5. An oscillator comprising a parallel resonant circuit, said circuit including at least one inductor and one capacitor, a pair of complementary transistors each having at least emitter, collector and base electrodes, said base electrodes connected together to one side of the parallel resonant circuit, said collector electrodes being respectively connected to opposed terminals of a voltage supply and coupled to the other terminal of the resonant circuit, and said emitter electrodes being connected to the capacitor.

6. Apparatus as in claim 5 wherein said complementary transistors comprise a PNP and an NPN transistor.

7. In a magnetic tape system including at least one magnetic head having a winding thereon, a source of alternating current frequencies comprising a parallel resonant circuit, said parallel resonant circuit including two series capacitors and a winding of said head in parallel therewith, a pair of complementary transistors, each having at least emitter, collector and base electrodes, said base electrodes being connected to one side of the parallel resonant circuit, said collector electrodes respectively connected to opposed terminals of a voltage source and coupled to the other terminal of the resonant circuit, and said emitter electrodes being connected to the junction of said two capacitors to form a symmetrical complementary oscillator.

8. Apparatus as described in claim 7 wherein said complementary transistors comprise a P–N–P and an N–P–N transistor.

9. Apparatus as in claim 7 wherein a blocking capacitor is connected in series with said winding.

10. Apparatus as defined in claim 7 wherein said resonant circuit includes erase and bias windings.

11. An oscillator comprising a parallel resonant circuit, said circuit including at least one inductor and two series capacitors in parallel with said inductor, a pair of complementary transistors each having at least emitter, collector and base electrodes, said base electrodes being connected together to one side of the parallel resonant circuit, said collector electrodes respectively connected to opposed terminals of a voltage supply and coupled to the other terminal of said resonant circuit, and said emitter electrodes being connected to the junction of said two capacitors.

12. An oscillator as described in claim 11 wherein said complementary transistors comprise a P–N–P and N–P–N transistor.

13. An oscillator as defined in claim 11 wherein the blocking capacitor is connected in series with said inductor.

References Cited in the file of this patent

UNITED STATES PATENTS

| | | |
|---|---|---|
| 2,351,009 | Camras | June 13, 1944 |
| 2,351,011 | Camras | June 13, 1944 |
| 2,633,504 | Beer | Mar. 31, 1953 |
| 2,698,386 | Eberhard et al. | Dec. 28, 1954 |
| 2,750,507 | Law | June 12, 1956 |
| 2,797,328 | Miller | June 25, 1957 |
| 2,812,437 | Sziklai | Nov. 5, 1957 |
| 2,829,257 | Root | Apr. 1, 1958 |

FOREIGN PATENTS

| | | |
|---|---|---|
| 70,462 | Norway | May 20, 1946 |

OTHER REFERENCES

Wireless World Magazine, October 1953, pages 475–478. (Copy in Div. 65.)

Radio & TV News Magazine, July 1956, pages 105–107.